July 27, 1926.
D. WILLS
WEED HARROW
Filed Oct. 11, 1924
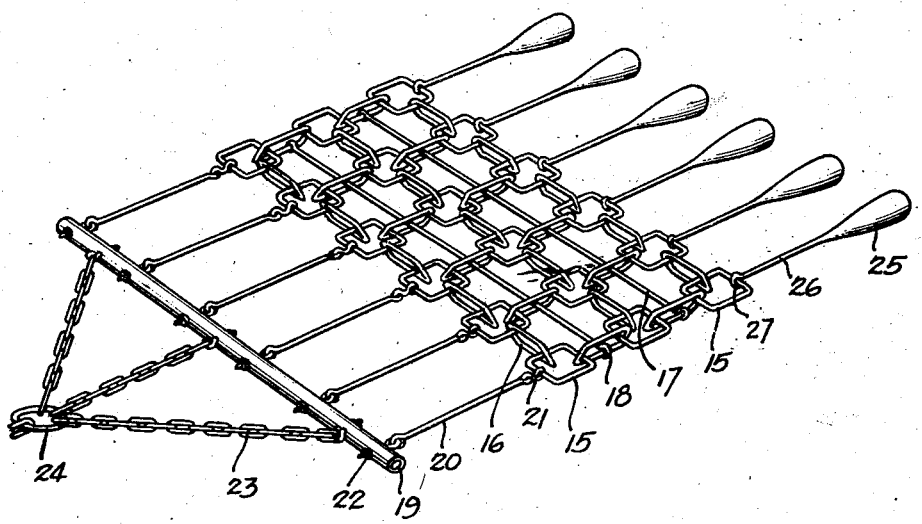
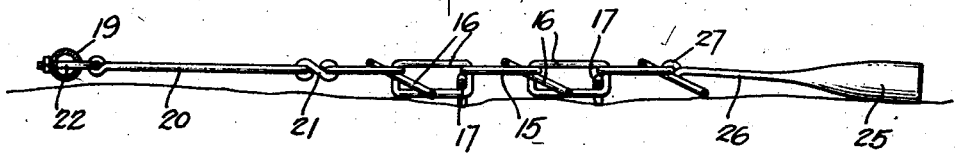
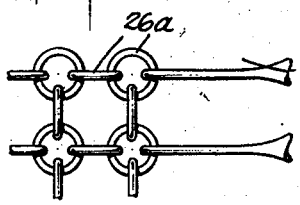
Inventor
DAVID WILLS.
Munn & Co.
Attorneys Patented July 27, 1926.

1,594,085

UNITED STATES PATENT OFFICE.

DAVID WILLS, OF CLEARWATER, CALIFORNIA.

WEED HARROW.

Application filed October 11, 1924. Serial No. 743,070.

My invention relates to and has for its purpose the provision of a harrow which is extremely light, inexpensive and durable, and which is constructed so that when drawn over a harrowed field it will operate to automatically gather weeds or other forms of vegetation from the surface of the ground and discharge the same in bundles, my invention further operating to disintegrate clods of earth and remove the weeds therefrom so that the latter will also be gathered and similarly discharged.

I will describe only one form of weed harrow embodying my invention and will then point out the novel features thereof in claims.

In the drawings,

Figure 1 is a view showing in perspective one form of weed harrow embodying my invention;

Figure 2 is a central, longitudinal, vertical, sectional view of the weed harrow shown in Figure 1 and illustrating one of the several positions the links of the harrow will assume when in operative engagement with the ground;

Figure 3 is a fragmentary plan view of another form of weed harrow embodying my invention.

Referring specifically to the drawings, in which similar reference characters refer to similar parts, my invention in the form illustrated in Figures 1 and 2, is shown as comprising a body made up of a plurality of chains arranged in intersecting relation and comprising horizontally disposed links 15 and vertically disposed links 16, the two links in the present instance being square in outline and lapping each other so that they are permanently and pivotally connected. The vertical links 16 extend both transversely and longitudinally of the body, thus cooperating with the horizontal links 15 in forming the intersecting chains.

In order to maintain the chains constituting the body of the weed harrow in extended position transversely, spreader bars or rods 17 are arranged transversely of the body so as to extend through the longitudinally disposed links 16, the ends of the bars being looped as indicated at 18 so as to movably receive the outermost longitudinal links.

The body of the weed harrow is adapted to be drawn over the ground through the medium of a draft bar 19 connected to the body through drag rods 20. The rear ends of the drag rods are pivotally connected to the foremost row of horizontal links 15 through S-links 21, while the forward ends of the drag rods are connected to the draft bar through eye-bolts 22. As clearly shown in Figure 1, there is one drag rod provided for each longitudinal chain, and the rods are connected at correspondingly spaced intervals to the draft bar 19. Draft chains 23 extend forwardly from the draft bar 19, where they are connected to a ring 24, to which latter another chain may be connected for associating the weed harrow as a unit to a tractor or some other means of drawing the harrow along the ground.

In order to maintain the body of the weed harrow in proper extended position longitudinally and at the same time to prevent the rear end of the body from being thrown upwardly and forwardly upon itself during the operation of the harrow, I have provided billets or weights 25 having forward reduced extensions 26 looped as at 27 to pivotally receive the rear row of horizontal links 15.

In operation, the weed harrow is adapted to be drawn over a previously harrowed field from which it is desired to remove the weeds or other form of vegetation. During the forward movement of the harrow, the transverse vertical links 16 occupy a forwardly inclined position, as shown in Figure 2, while the longitudinal vertical links 16 will be inclined to one side or the other, the two links co-operating to form depending projections which contact with the surface of the ground to engage the weeds or other vegetation, and thus drag the same in advance of the links, whereby a gathering into a bundle of the weeds is effected. When the bundle reaches such a size that the body of the harrow will be caused to ride over the same in its forward movement, the bundle will be automatically liberated and deposited at the rear of the harrow. Although I have specifically described the links 16 as occupying definite positions, it is to be understood that because of their pivotal association with the horizontal links 15 it will be clear that they are capable of occupying positions other than those stated, but in any event, the links will cooperate in gathering weeds as above described.

Referring now to Figure 3, I have here shown links 26ª which are associated with each other to form a body similar to that described in connection with the body shown in Figure 1. However, in the present instance, the links are of ring form, as shown, and as so constructed operate as effectively for the gathering of weeds as do the links 15 and 16. The particular form of the links is not material to the invention, so long as the general arrangement as specifically described in connection with the body shown in Figure 1 is maintained.

Although I have herein shown and described only two forms of weed harrow embodying my invention, it will be understood that various changes and modifications may be made without departing from the spirit of my invention and the spirit and scope of the appended claims.

I claim as my invention:

1. A harrow formed of identical transverse chains each consisting of identical rectangular links, and lonigtudinal links of rectangular form connected with the adjacent links of the respective transverse chains, long drag bars pivotally joined to the links of the front transverse chain, trailing weights carried by the links of the rear transverse chain, and a draft bar connected with said drag bars, the alternate links of the transverse chains all occupying the same relative positions when pull is applied to the draft bar, and the said links adapted to bear lengthwise against the ground so as to maximize the effective scraping surface of the harrow.

2. A harrow comprising a series of identical transverse chains each consisting of a series of loosely joined rectangular links, a series of rectangular links joined to the adjacent links of the respective transverse chains, and a draft bar connected with the front transverse chain so that when pull is applied to said bar, the alternate links of the respective transverse chains will occupy substantially the same positions with the long lower bars of the links in lengthwise contact with the ground and in angular positions to the longitudinal links.

3. A harrow comprising a series of transverse chains and a series of longitudinal links connecting the chains, each of said chains comprising identical rectangular links and the respective chains being joined together between the corners of the links, and a draft bar connected to the front transverse chain so that the alternate links of all of the transverse chains will be canted when pull is applied to the bar and thereby present the lower connecting portions of the alternate links of the transverse chains lengthwise against the ground and at positions angularly with respect to the longitudinal links.

DAVID WILLS.